United States Patent [19]
Veil et al.

[11] Patent Number: 6,092,202
[45] Date of Patent: Jul. 18, 2000

[54] METHOD AND SYSTEM FOR SECURE TRANSACTIONS IN A COMPUTER SYSTEM

[75] Inventors: Leonard Scott Veil, Campbell; Gary Paul Ward, Sunnyvale; Richard Alan Weiss, Los Altos Hills; Eric Alan Murray, Los Gatos, all of Calif.

[73] Assignee: **N*Able Technologies, Inc.**, Cupertino, Calif.

[21] Appl. No.: 09/084,078

[22] Filed: May 22, 1998

[51] Int. Cl.[7] .............................. H04L 9/00; G06F 11/00
[52] U.S. Cl. ........................ 713/201; 713/153; 705/64
[58] Field of Search ................................. 713/200, 201, 713/150, 151, 152, 153, 154; 708/135; 705/44, 64; 380/4; 709/220, 227, 228

[56] References Cited

U.S. PATENT DOCUMENTS

| | | | |
|---|---|---|---|
| 4,319,079 | 3/1982 | Best | 178/22.09 |
| 4,797,928 | 1/1989 | Dykes | 380/49 |
| 5,406,624 | 4/1995 | Tulpan | 380/4 |
| 5,745,574 | 4/1998 | Muftic | 380/23 |
| 5,815,571 | 9/1998 | Finley | 713/200 |
| 5,896,499 | 4/1999 | McKelvey | 713/201 |

*Primary Examiner*—Robert W. Beausoliel, Jr.
*Assistant Examiner*—Christopher Alan Revak
*Attorney, Agent, or Firm*—Sawyer Law Group LLP

[57] ABSTRACT

A method and system for secure transactions. The method and system comprise a security co-processor and an interface for interfacing the security co-processor to a host computer system. The method and system wherein secure transaction processing is performed locally in the security co-processor and non-secure transaction processing is performed in the host computer system. The method and system further include means for providing trusted input coupled to the security co-processor. In addition, the method and system include a second interface coupled to the security co-processor for receiving sensitive data from a smart card, and a trusted display coupled to the security co-processor for providing true transaction information. One advantage of the method and system in accordance with the present invention is that transactions are protected from unauthorized intrusion and, in addition, participation is proven so that transactions cannot be repudiated. Another advantage is that the method and system maintain compatibility with smart cards technology. Yet another advantage is that, because the security co-processor has functionality, smart cards require built-in functionality only for storing sensitive data including account number and private-key and for providing digital signatures to prove participation. Moreover, smart cards can carry biometric data to be recognized by the method and system for an even more reliable proof of participation and card-holder verification. With less built-in functionality, the smart cards are less complex and less expensive. Finally, the method and system are easily implemented with current technology, and the overall cost of the system is reduced.

36 Claims, 8 Drawing Sheets

System with Two Tier Memory Architecture

600

METHOD AND SYSTEM FOR SECURE TRANSACTIONS IN A COMPUTER SYSTEM

FIELD OF THE INVENTION

The present invention relates to a method and system for providing secure transactions in a computer system and more particularly to a method and system for providing a secure environment within the computer system for these transactions.

BACKGROUND OF THE INVENTION

Since computer networks have emerged as a medium for conducting electronic commerce and other types of transactions, there has always been a need for maintaining the integrity and validity of these transactions. However, conventional computer networks provide an environment which is fraught with security breaches that will allow hackers to compromise the integrity and validity of such transactions.

Conventional computer networks, such as a local area network, a wide area network and/or a public network (e.g. the Internet), link personal computers and workstations to one or more servers and to each other. This environment permits computer users to interact with the servers or with each other. Transactions between computer users or between computer users and servers are processed using applications which are executed on conventional operating system platforms such as OS/2®, Windows®, UNIXC® etc. These transactions include high value electronic commerce and other private transactions which use confidential or sensitive data such as bank, credit and debit accounts information.

However, computer hackers can "invade" data resident on computer disk and in memory as well as data associated with real time processing. Therefore, any data, sensitive or otherwise, passing through or stored in the computers can be compromised by hackers or intruders that can gain access to it via the computer network. Moreover, even if the sensitive data were to be encrypted, other sensitive data inside the computers may be susceptible to attack when, for example, the computer systems download and execute rogue programs. A rogue program allows hackers to surreptitiously capture the computer users' name, home address, E-mail address etc. without being noticed. Computer hackers can then use the sensitive data to impersonate the computer users and thereby perform fraudulent transactions.

In this environment secure transactions become very difficult. As a result, conventional computer systems now use smart cards for secure transactions. A conventional smart card with considerable built-in functionality includes an 8 bit microcontroller, a read only memory (ROM), an EEPROM (electronically erasable programmable ROM), a random access memory (RAM), and other optional peripheral devices, e.g., cryptographic unit. The EEPROM holds the sensitive data which is personal to the individual smart card holder, the ROM holds a transaction application program code, and the RAM holds temporary variables. In the cryptographic unit, which can be a multiplexer or other cryptography engine, the sensitive data is encrypted.

Smart cards vary in level of their built-in functionality which includes storage and processing of sensitive data. The sensitive data is provided to smart cards instead of the computer disk or memory in order to protect it against unauthorized access. Thus, smart cards can replace the computers in storing and processing of the sensitive data.

It is noted that if smart cards were to include a complete built-in functionality which would preclude any processing of sensitive data in the conventional computer system, these smart cards would provide an adequate security environment for electronic transactions. However, the more built-in functionality the more expensive the smart cards becomes. Notwithstanding the cost, implementation of the built-in functionality is limited by physical constraints of smart cards.

Typically, a die size of 5 mm×5 mm would be used to implement the built-in functionality of smart cards because a larger die size would degrade the ability to connect to them. Also, the chips embedded in smart cards can crack more easily because the smart cards are typically stored in physical wallets which are put in back pockets. Furthermore, the ISO7816 standard, which is an industry standard for smart cards, imposes a bending limitation on smart cards. Since a larger die cannot bend the smart cards must be small. Finally, the current capacity of smart cards is 50–100 mA. By comparison, a typical processor with extensive built-in functionality has a current capacity 40 times higher. Therefore, including complete built-in functionality in smart cards is not feasible.

As a result, at least some processing of the sensitive data must be performed in the conventional computer system in a non-secure manner. The sensitive data remains resident on a smart card until it is needed by the computer for processing. Once it is read from the smart card and transferred for processing to the computer the sensitive data becomes vulnerable to unauthorized access. Therefore, the use of smart cards with conventional computer systems does not entirely solve the problem of providing a secure environment for conducting electronic transactions.

This problem is compounded when, in conventional computer systems, sensitive data is entered on a keyboard and transferred to the computer for processing. For example, personal identification numbers (PIN), typically used for unlocking private or limited access accounts, can be stolen once they are entered on the keyboard by the computer user.

Furthermore, access to display controllers of computers permits rogue programs or viruses to produce erroneous or falsified displays which replace or conceal material information such as transaction values. As a result, fraudulent transactions can remain undetected. Also, when the display is compromised one or more of the transacting parties have inconsistent misleading displays. The inconsistency of the displays can give rise to claims that there was no meeting of the minds, and that the transactions are therefore invalid and unenforceable. As a consequence, such transactions can be easily repudiated by one or more of the transacting parties.

Therefore, conventional systems utilizing smart cards fail to provide real secure transactions. Moreover, in this environment it can be difficult to authenticate transactions for the purpose of enforcing them as valid agreements between the transacting parties. For example, individuals who change their minds after concluding the transactions can repudiate the transactions by claiming that a security breach allowed hackers to transact in their place. Without proof that the repudiating party participated in the particular transaction(s), the other transacting parties are left without recourse.

Therefore, what is needed is a system which provides a secure environment for electronic commerce and other types of confidential transactions. The system is also needed in order to allow transactions with smart cards including smart cards having less than a complete built-in functionality. The system is further needed in order to reduce the cost of the smart cards and, in turn the overall cost of the system. The system is additionally needed to allow uncompromised acknowledgment and authentication of the transactions. Finally, the system needs to be easily implemented with existing technology. The present invention provides a method and system for addressing the foregoing problems.

SUMMARY OF THE INVENTION

A method and system for secure transactions. The method and system comprise a security co-processor and an interface for interfacing the security co-processor to a host computer system. In the method and system the secure transaction processing is performed locally in the security co-processor and non-secure transaction processing is performed in the host computer system. The method and system further include means for providing trusted input coupled to the security co-processor. In addition, the method and system include a second interface coupled to the security co-processor for receiving sensitive data from a smart card, and a trusted display coupled to the security co-processor for providing true transaction information.

One advantage of the method and system in accordance with the present invention is that transactions are protected from unauthorized intrusion and, in addition, participation is proven so that transactions cannot be repudiated. Another advantage is that the method and system maintain compatibility with smart cards technology. Yet another advantage is that, because the security co-processor has considerable functionality, smart cards require built-in functionality only for storing sensitive data including account number and private-key and for providing digital signatures to prove participation. Moreover, smart cards can carry biometric data to be recognized by the method and system for an even more reliable proof of participation and card-holder verification. With less built-in functionality, the smart cards are less complex and less expensive. Finally, the method and system are easily implemented with current technology, and the overall cost of the system is reduced.

DETAILED DESCRIPTION OF THE INVENTION

The present invention relates to a method and system for providing secure transactions in a computer system and more particularly to a method and system for providing a secure environment within the computer system for these transactions. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

Figure 1:
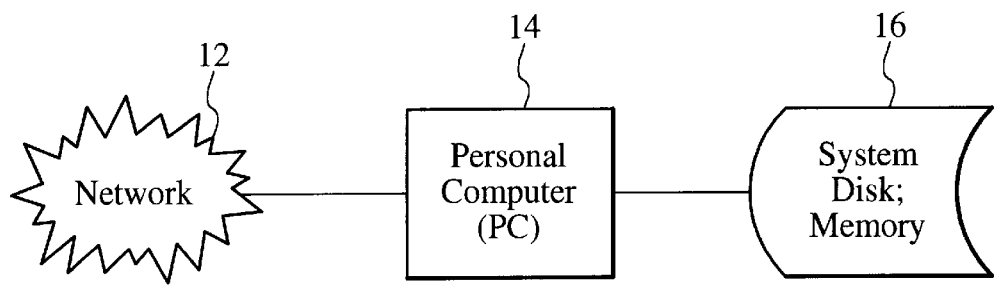
FIG. 1 is a block diagram of a conventional system for performing electronic transactions.

Computer users interact with each other in order to conduct transactions electronically through computer networks. Transactions conducted over computer networks are commonly referred to as electronic transactions. FIG. 1 is a block diagram of a conventional system 10 for performing electronic transactions.

As illustrated in FIG. 1, the system 10 includes a personal computer or workstation (computer) 14 which is equipped with a computer disk and memory (disk) 16. The computer 14 is linked to other computers (not shown) through the network 12. The network 12 can be a local area network linking computers in one building, a wide area network linking computers of one organization located in separate buildings, a public network such as the Internet, etc.

A majority of the application programs for conducting electronic transactions (electronic transactions applications) are executable on one of the conventional operating system platforms such as OS/2®, Windows®, UNIX® etc. It is generally known that conventional operating system platforms provide a non-secure computing environment for executing the electronic transactions applications. In the non-secure computing environment, confidential information related to the electronic transactions (sensitive data) can be easily compromised. Breaching the security of communications and electronic transactions in conventional systems can include the decoding of files containing cryptographic keys, possibly unlocking access to other systems.

Accordingly, the need for preserving the integrity and protecting the validity of electronic transactions gave rise to alternative systems and methods. These systems and methods provide a more secure environment for conducting electronic transactions.

It is known that transaction information can be authenticated within a computer system. Electronic transactions applications are typically associated with well-known public-key cryptography algorithms which utilize a key-pair of a public key and a private-key for authentication. The public-key is data available in the public domain. The private-key is sensitive data personal to its owner. Private-keys are provided to individuals on smart cards issued to them by organizations such as banks, credit companies, employers, etc.

Figures 2A, 2B:
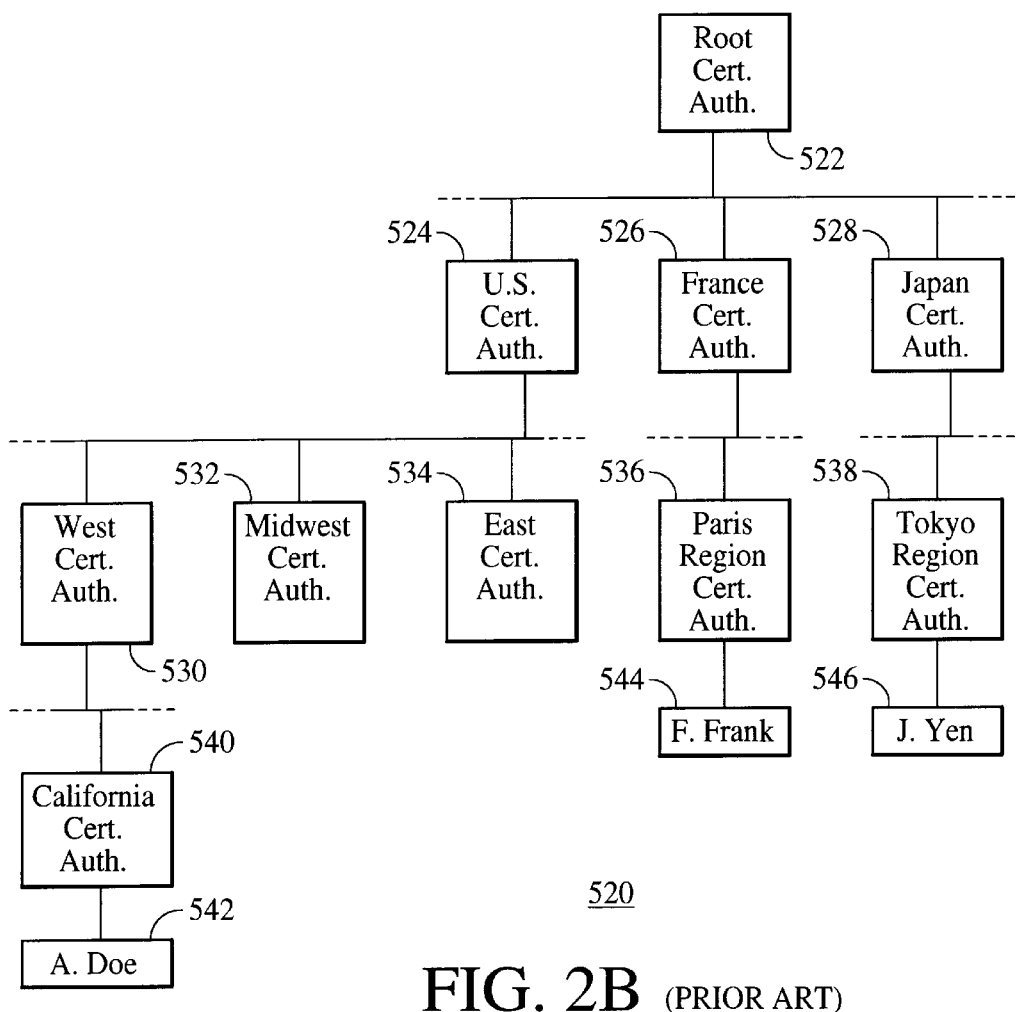
FIG. 2A is a diagram of a conventional certificate structure.
FIG. 2B is a diagram of a conventional certificate chain for authenticating electronic transactions.

A digital certificate binds the key-pair to a name thus providing a digital identity. The digital certificate is used to verify that the public-key belongs to the particular individual using it. FIG. 2A is a diagram of a conventional certificate structure. A conventional certificate structure conforms, for example, with the X509.v3 standard certificate structure. A conventional digital certificate 500 includes a user name 502, a certificate validity date 504, and the public-key 508. The certificate is "signed" by a mutually trusted authority (i.e., trusted by the public-key user and his transacting party). The mutually trusted authority, commonly known as the certificate authority or issuing authority 506, authenticates the public-key user identity by providing a signature 510, verifying that the public-key really belongs to the public-key user.

With public-key cryptography, a message, encrypted or unencrypted, can be "signed" with the private-key and transmitted to an addressee. Then, the addressee, or anyone having the public-key, can use the public-key to decipher the message and know who sent it. Digital certificates allow authenticating messages by tracing the messages to their source. Typically, a certificate chain is used for this purpose.

FIG. 2B is a diagram of a certificate chain for authenticating electronic transactions. A certificate chain having a root certification authority 522 allows individuals in different countries and regions to electronically transact with each other. The root certification authority 522 allows certification authorities in various countries, and regions within those countries, to issue digital identities to individuals. The certificate chain creates a trust relationship where trust flows upwards from each transaction party to the root certification authority 522. For example, there may be a Japanese certification authority 528, a French certification authority 526, and a U.S. certification authority, each issuing digital identities to Japanese, French and U.S. residents, respectively. In Japan, a Tokyo region certification authority 538 may issue a digital identity 546 to J. Yen. In France, a Paris region certification authority 536 may issue a digital identity 544 to F. Frank. In the U.S., there may be an East certification authority 534, a Mid-west certification authority 532 and a West certification authority 530. The West certification authority 530 may issue a digital identity to a California certification authority 540 which, in turn, may issue a digital identity 542 to A. Doe.

When A. Doe, a California resident, wants to conduct electronic transactions by exchanging messages with J. Yen in Japan and/or with F. Frank in France, A. Doe needs to be sure that the electronic transactions are conducted with J. Yen and/or F. Frank and not with imposters. Through existing certificate technology, it is possible to verify the digital identity of a sender of transaction messages by traversing upwards through the certificate chain. In checking the digital certificate in someone's message, A. Doe can check if there is a valid digital identity in the person's digital certificate. That is, A. Doe can check if in J. Yen's message there are valid certification authority signatures of the Tokyo region certification authority 538, the Japan certification authority 528, and the root certification authority 522.

Public-private-key cryptography is characterized in that it is an asymmetric cryptography wherein if transformation (encryption) is done with the user's public-key, only the user's private-key will do the reverse transformation (decryption). That is, only one of the keys is needed on each side, one for the transformation and the other for the reverse transformation, respectively.

In contrast, symmetric key cryptography uses one key, which both sides use to encrypt and decrypt their messages. One side encrypts a message using the key, and the other side uses the same key to decrypt the message. This key must be kept secret; if an unauthorized person obtains the key, he can read all the encrypted communications. Thus, key distribution is a critical concern—there are no public keys which can be freely distributed, all keys must be kept secret and a highly secure distribution scheme must be devised to preserve the security of the system. Private-public-key systems allow parties who haven't previously met to communicate securely. Since the public keys can be widely distributed, anyone can get a copy of the public key for a person with whom they wish to communicate securely and encrypt a message to them in their public key.

Figure 3:
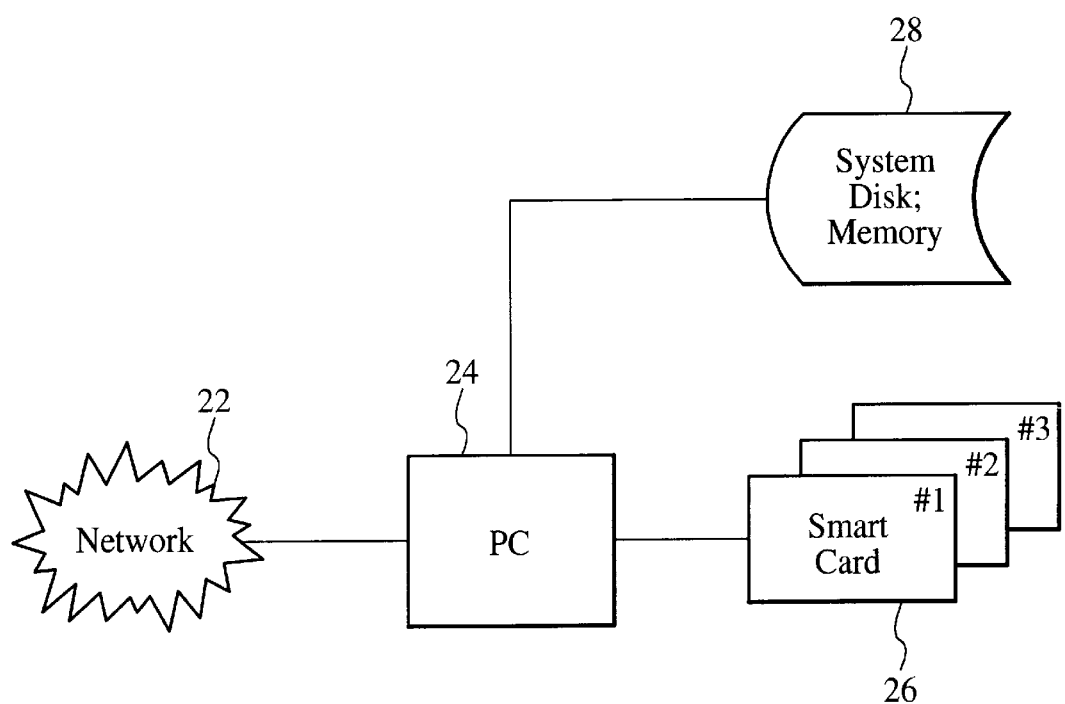
FIG. 3 is a block diagram of a conventional system for performing secure electronic transactions.

FIG. 3 is a block diagram of a conventional system 20 for performing secure electronic transactions. As illustrated, the system comprises a computer 24 which performs secure transactions with a smart card 26. The computer 24, typically receives one of the smart card 26 at a time. The network 22 and the computer 24 are similar to the network 12 and the computer 14 of FIG. 1. Smart card 26 includes built-in functionality for storing and processing sensitive data including personal data and the private-key.

With a smart card 26, the sensitive data is not accessible by computer hackers. Therefore, sensitive data is not subject to "attack" by computer hackers unless and until it is read from the smart card 26 and transferred to the computer 24 for further processing and transmission over the network 22 to other computers.

However, access to data stored inside the computer 24 as well as access to data used inside the computer 24 during real-time processing renders the data including the sensitive data vulnerable to attack. Accordingly, sensitive data which has been transferred to the computer 24 is typically erased from the computer 24 after it is no longer needed. However, it is very difficult to ensure that data has been correctly erased from the computer system in non-secure operating systems, as the data may be temporarily stored in operating system related files on a computer system's disk drive. Whenever the sensitive data is resident in the computer 24, it is subject to attacks such as viral and trap-door attacks. Viruses and trap doors are inadvertently introduced into the computer 24 by the computer user who down loads and executes rogue programs which surreptitiously capture the sensitive data. Once the security of the electronic transactions applications is compromised, the captured sensitive data can be used to impersonate the computer user.

One mechanism that can be used to minimize the compromising of security is by processing the transaction entirely on the smart card 26. This, however, is not a viable alternative for processing complex electronic transactions protocols because a smart card 26 is constrained by die size restrictions, as well as power restrictions. The physical restrictions increase the costs of producing a smart card and limit their built-in functionality. The cost of producing a smart card increases as in their built-in functionality increases to the point wherein some business models cannot take advantage of this technology.

In this environment, the need for preserving the integrity and protecting the validity of the electronic transactions cannot be effectively met. Accordingly, the present invention is directed toward a system and method for satisfying this need. A key feature of the present invention is the fact that electronic transactions applications can be executed in a secure computing environment outside the reach of computer hackers without requiring all the security functionality being built into the smart card. In a system having an architecture in accordance with the present invention, the secure computing environment can be separated from the traditional computing environment by a firewall, and therefore processing in the system is distributed between the secure and traditional computing environments. The non-secure portion of electronic transactions applications can continue to operate in the traditional non-secure computing environment, while the secure portion of these applications is executed in the secure computing environment. Thus, the distributed processing plays a significant part in protecting the sensitive data. The system and method in accordance with the present invention are described in more detail below.

Figure 4:
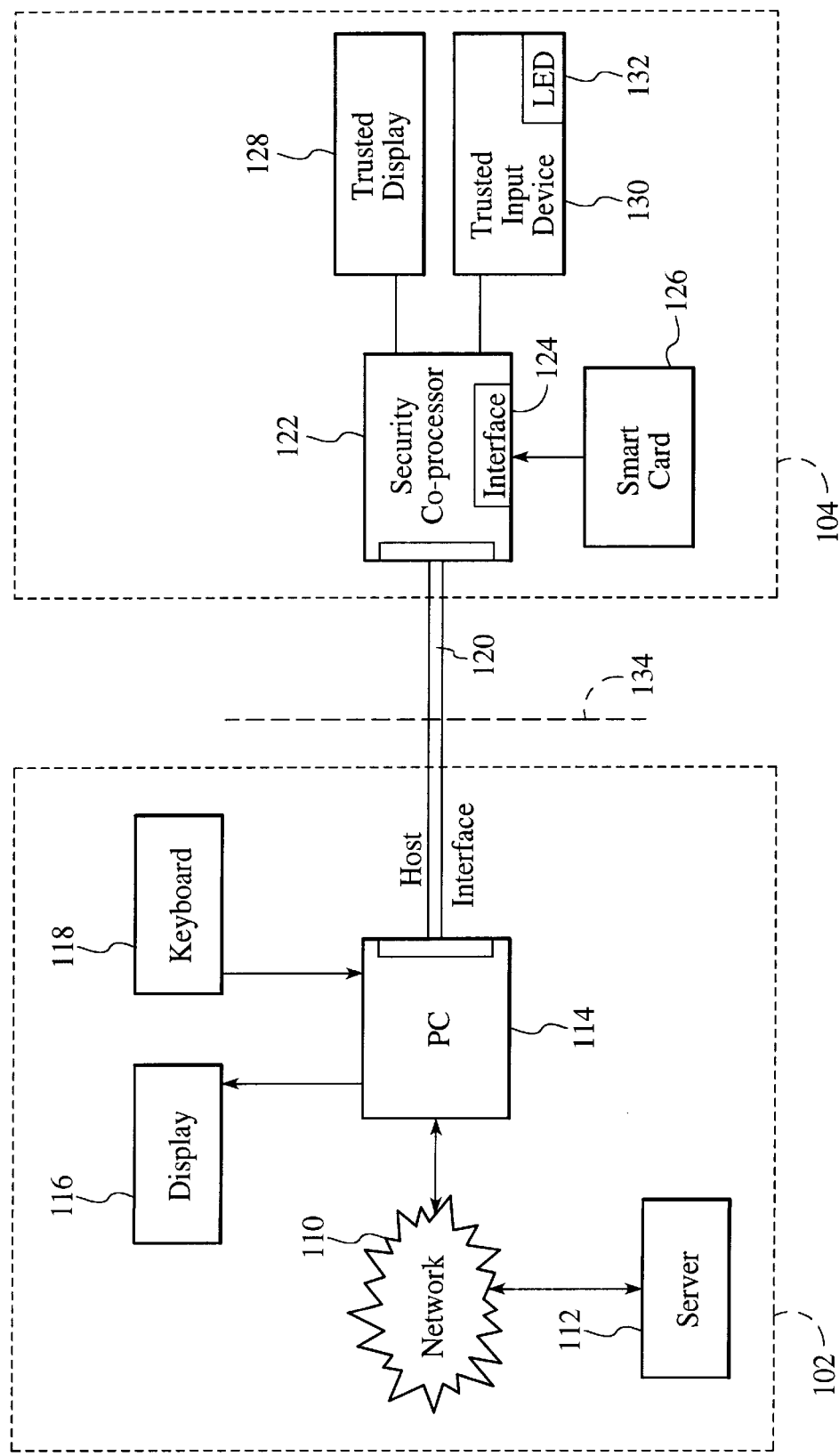
FIG. 4 is a block diagram of a system including a security co-processor in accordance with the present invention.

FIG. 4 is a block diagram of a system 100 including a security co-processor 122 in accordance with the present invention. The security co-processor 122 includes a host interface 120 for interfacing with a host computer (computer) 114 which is, in turn, connected to a network 110. The host interface 120 includes a interface 134 which is described herein below in more detail.

It should be understood that the location of the security co-processor 122 can vary and, without departing from the scope and spirit of the present invention, it can be fixed inside or outside the computer 114 or the keyboard 118, as long as the secure computing environment 104 is separate from the traditional computing environment 102. Preferably, the security co-processor 122 functions as an outboard processor separate from a processor inside the host computer 114.

The security co-processor 122 interfaces with a trusted display 128 and a trusted input 130. The security co-processor 122 further includes a smart card interface 124. The security co-processor 122 interfaces with smarts cards 126 which, as explained, are portable security devices for holding the sensitive data. The security co-processor 122 is preferably compatible with smart cards 126 conforming with the ISO7816 standard for smart card communications. It should be understood however, that compatibility of the security co-processor 122 with other types of smart cards 126 is within the scope and spirit of the present invention.

The system 100 architecture in accordance with the present invention, with the secure computing environment 104 being separated from the traditional computing environment 102 by the interface 134, enables the distributed processing of the electronic transactions. The distributed processing is characterized in that the security co-processor 122 is responsible for retrieving the sensitive data from the smart cards 126 and processing the sensitive data locally.

In the secure computing environment 104 provided by the security co-processor 122, the sensitive data is encrypted and/or wrapped in cryptographically signed messages. The encrypted sensitive data and/or cryptographically signed messages are then passed to the traditional computing environment 102 of the computer 114 for completion of the electronic transactions processing. The computer 114 sends transaction information containing the cryptographically signed message to another computer linked to it through the network 110. Thus, in the system in accordance with the present invention, the sensitive data is never processed by the computer 114 in the traditional computing environment 102 and it is therefore not susceptible to attack.

Since it is possible for bugs, viruses or rogue programs to adversely affect the electronic transactions applications, the present invention addresses this problem by providing for additional security in the form of a trusted input and display. To that end, in addition to the security co-processor 122, the secure computing environment 104 includes a trusted display 128 and a trusted input device 130 which includes a secure mode indicator such as a LED 132.

The trusted display 128 is separate and can be significantly different from the display 116 of the computer 114. The trusted display 128 is a dedicated display used for displaying data representing true transaction information such as transaction amount(s). The trusted display 128 can be, for example, a small LCD display or alike. When the security co-processor 122 processes transactions, it also gains access to the true transaction value(s) or amount(s). Therefore, the security co-processor 122 can provide the true transaction amount(s) to the trusted display 128, and guarantee that the amount(s) displayed correctly represent the values of the electronic transactions in progress.

The computer user can compare the transaction amount(s) displayed on the trusted display 128 with amount(s) displayed on the display 116 of the computer 114. For example, in an electronic transaction involving exchange of goods or transfer of money, a $5000 transaction may be shown as only a $500 transaction on the computer 114 display 116. When such a conflict is discovered, the computer user is thereby alerted to a possible tampering or attack.

Additionally, the trusted display 128 provides a visual feedback to the computer user when, for example, the computer user enters a PIN (personal identification number) to unlock the computer user's account. In conventional systems (such as system 20 of FIG. 3), when entering sensitive data on a keyboard, the sensitive data is transferred from the keyboard to the computer (24), and there it becomes vulnerable to attack. In contrast, the system 100 in accordance with the present invention prevents the sensitive data such as the PIN from passing through the computer 114.

To that end, control over keyboard entries is taken over the by the security co-processor 122. The security co-processor 122 determines if the keyboard entries provide sensitive data or not. If the keyboard entries provide data which is not sensitive, the data is transferred to the computer 114 to be processed in the traditional computing environment 102. If the keyboard entries provide sensitive data, the sensitive data is captured by the security co-processor 122 for processing in the secure computing environment 104. In this case, the LED 132 is turned on by the security co-processor 122 in order to provide an indication to the computer user of the secure mode.

In one embodiment, the keyboard 118 is converted into the trusted input device 130 by removing the conventional electronics from the keyboard 118 and in place thereof embedding therein the security co-processor 122 and other compatible components, wherein one of the applications executed by the security co-processor is a keyboard application. In this configuration, all the data provided by the keyboard entries passes through the security co-processor 122 which determines whether the data should be handed to the computer 114 or whether it should be processed locally by the security co-processor 122.

In another embodiment, the system 100 includes the keyboard 118 and, in addition, the trusted input device 130. In this configuration, the security co-processor 122 is not embedded in the keyboard 118 but is attached to the trusted input device 130, wherein the trusted input device is dedicated to the secure computing environment 104.

In yet another embodiment, the secure computing environment 104 can operate as a personal automatic teller machine (ATM) system that can be used for general purpose or commercial electronic transactions which do not require a full keyboard capability. The ATM includes a dedicated trusted keypad 130 interfaced through an RS 232 interface (not shown) and a trusted display 128.

In either one of the above embodiments, the security co-processor 122 and the trusted input device 130 together prevent unauthorized access to keyboard entries which provide the sensitive data. This, for example, prevents capture of the PIN numbers for unlocking the computer users' personal banking, debit and credit accounts without their knowledge and approval.

In order to provide the above-mentioned distributed processing, the security co-processor 122 includes the host interface 120 which preferably includes an interface 134.

The interface 134 acts as a "firewall" between the security co-processor 122 and the computer 144. In this specification what is meant by firewall is restricting host access to data and allowing approved security operations to be performed in the security co-processor 122. Therefore, the computer 114 does not have full access to data in the secure computing environment 104.

For example, the interface 134 can prevent the computer 114 from commanding the security co-processor 122 to allow the computer 114 to read all the memory of the security co-processor 122. Conversely, the interface 134 allows the computer 114 to command the security co-processor 122 to perform certain other transactions (no matter how much attack software is present in the computer 114).

The interface 134 functionality is generally enforced by a well-known application programing interface (API) which defines how the computer 114 and the security co-processor 122 may communicate with each other. Preferably, the API is directed toward electronic transactions applications, particularly commercial electronic transactions. However, it should be understood that the API can be directed toward other types of electronic transactions without departing from the scope and spirit of the present invention.

Figure 5:
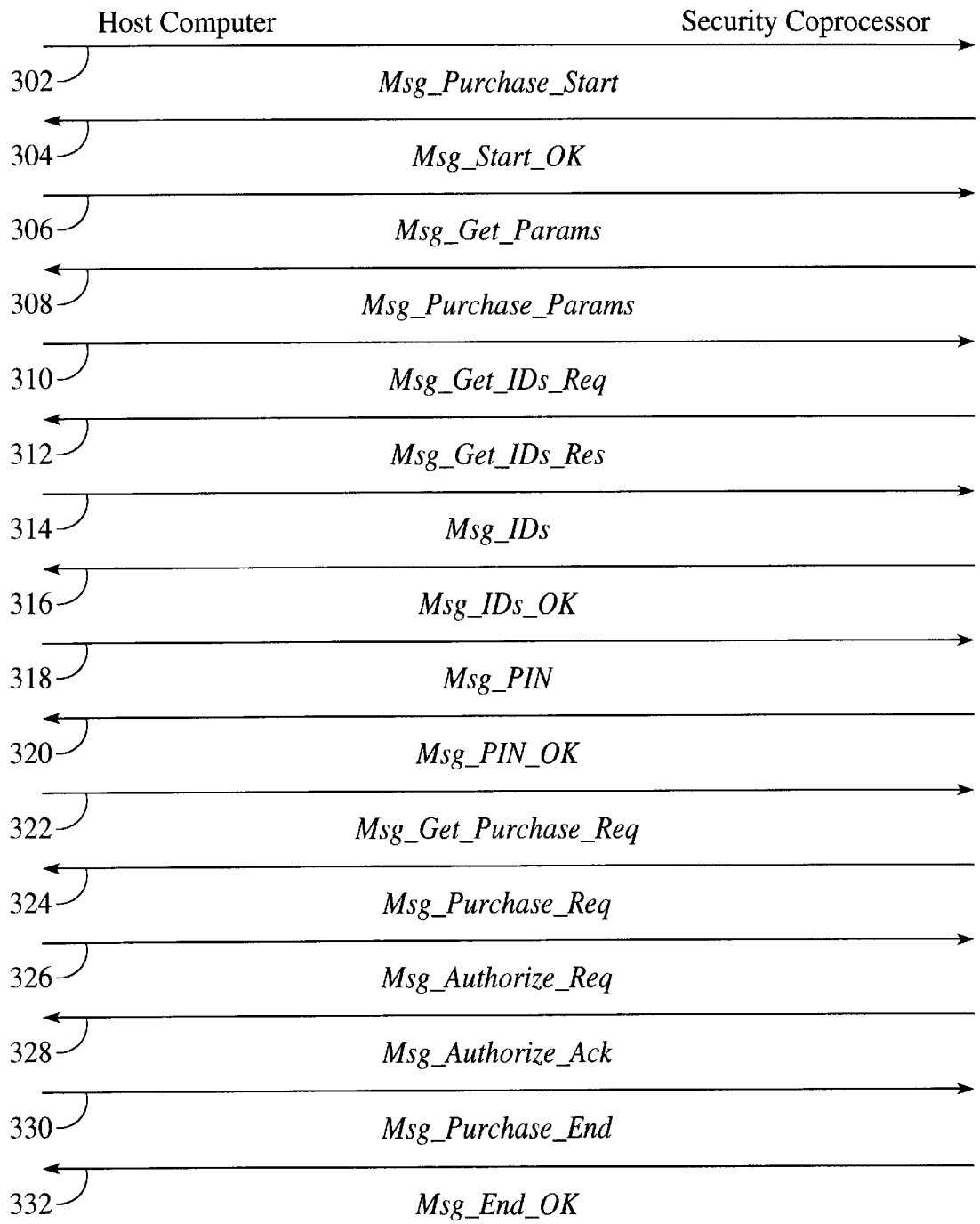
FIG. 5 illustrates a firewall including an interface communication protocol for secure electronic transactions in a system with the security co-processor in accordance with the present invention.

The interface 134 functionality is described hereinbelow in conjunction with FIGS. 4 and 5. FIG. 5 illustrated a firewall including an interface communication protocol for secure electronic transactions in a system with the security co-processor in accordance with the present invention. The API enforces the interface 134 functionality by utilizing an interface communication protocol defining how the computer 114 and the security co-processor 122 may communicate with each other.

The interface communication protocol for secure electronic transactions involving, for example, credit purchases, is initiated by the computer 114 via a purchase start message 302 informing the security co-processor 122 that a purchase operation is requested. The purchase start message 302 prompts the security co-processor 122 to activate an electronic transactions application for credit purchases (purchase application). In response, the security co-processor 122 sends to the computer 114 an acknowledgment 304.

Next, the computer 114 sends a request parameters message 306. The security co-processor 122 responds with purchase parameters 308 including a credit card brand identifier, a transaction language, a digital signature method such as a physical or a virtual token and other relevant parameters. The computer 114 then sends a get identity request 310 prompting the security co-processor 122 to accept digital identities of the computer users which are parties to the electronic transaction. In response, the security co-processor 122 sends an identification resource message 312 acknowledging that the security co-processor 122 has allocated resources for identification processing.

Next, the computer 114 sends the digital identities 314 of the electronic transaction parties, typically in the form of digital certificates. The security co-processor 122 responds with an identities valid message 316. During processing of the digital identities data, the security co-processor 122 stores digital identities which have not been processed before. The computer 114 then sends a PIN request message 318 prompting the computer user to enter the PIN for unlocking the sensitive data in the smart card 126. In response, the security co-processor 122 enters into the secure mode, turns on the secure mode indicator (LED 132), and allows the computer user to safely enter the PIN. The security co-processor 122 also acknowledges the PIN request via message 320.

A purchase request message 322 from the computer 114 prompts the security co-processor 122 to process the PIN and the sensitive data via the purchase application, including providing encryption of the sensitive data and authentication of the purchase request. The security co-processor 122 then hands to the computer 114 a purchase response message 324 which contains the encrypted data and authenticated purchase request message. The computer 114 can then forward the purchase response message 324 via the network 110 to any one of the electronic transaction parties.

Computer 114 receives a reply from the electronic transaction party which is a purchase authorization or denial. Computer 114 hands this message to the security co-processor 112, which verifies the cryptographic signature on it to validate the electronic transaction party. The resulting verified authorization or denial message 328 is handed to the computer 114. Finally, a purchase request end message 330 is sent by computer 114 to the security co-processor 112 which acknowledges with a purchase ended message 332.

The above described model of interface communication protocol for the enforcement of the interface 134 functionality highlights the distributed processing advantage provided by the secure computing environment 104. As demonstrated, the computer 114 has no direct access to the sensitive data throughout the entire electronic transaction process.

Figure 6:
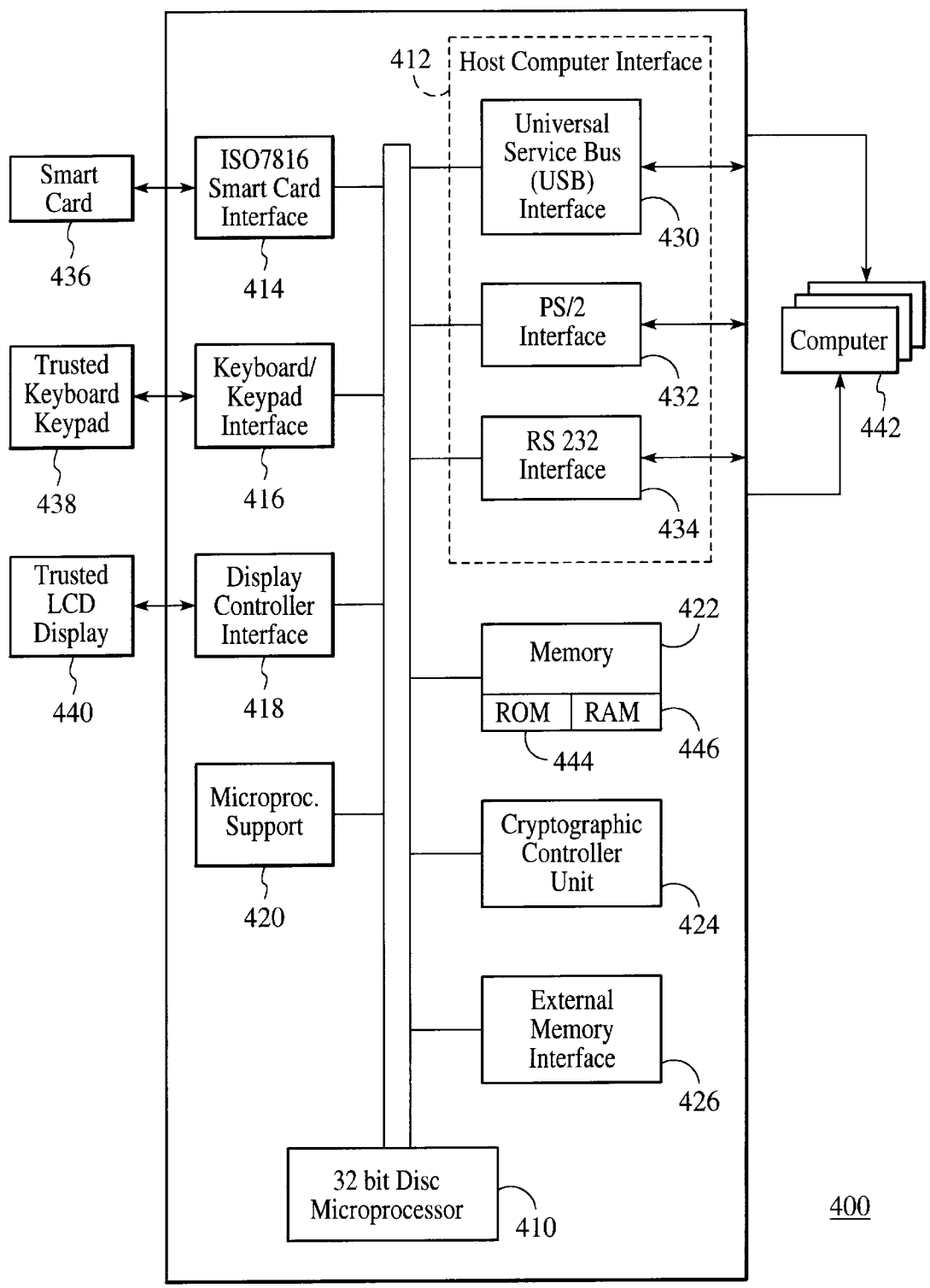
FIG. 6 is a more detailed block diagram of the security co-processor in accordance with the present invention.

The security co-processor 122 is another important feature of the present invention. FIG. 6 is a detailed block diagram of a security co-processor 400 in accordance with the present invention.

As illustrated in FIG. 6, the security co-processor 400 includes a processor 410 (e.g. a 32 bit reduced instruction set controller (RISC)). The processor 410 is coupled to an ISO7816 smart card interface 414 for interfacing to smart cards 436 which conform to the ISO7816 standard. The processor 410 is further coupled to a keyboard/keypad interface 416 and a display controller interface 418 for interfacing with the trusted input device 438 and the trusted display 440, respectively. A microprocessor support 420 coupled to the processor 410 includes components, such as interrupt controller and timers, needed for the operation of the processor 420.

The processor 410 is further coupled to a memory 422 and an external memory interface 426. The memory 422 preferably includes a read only memory (ROM) 444 and a random access memory (RAM) 446. In the ROM 444 resides a security program code which includes one or more of the electronic transactions applications. Temporary variables, display images, etc., are placed in the RAM 446.

The processor is additionally coupled to a host computer interface 412 which includes interfaces such as a universal service bus (USB) interface 430, a PS/2® interface 432, and an RS-232 interface 434 for interfacing with computers 442. One or all of these interfaces 430, 432 and 434, can be used at one time to interface with one or more of the computers 442.

As explained, the security co-processor 400 maintains control over the local processing of the sensitive data. An important aspect of the local processing is performed by a cryptographic controller unit 426 within the security co-processor 400. The processor 410 is coupled to the cryptographic controller unit 426 for controlling its operations.

When the sensitive data is captured locally in the security co-processor 400, it is then encrypted (i.e., scrambled) in the cryptographic controller unit 426, so that when the sensitive data is handed to the computers 442 for transmission through the network (not shown) it is in encrypted form. Each of the electronic transaction parties receiving the encrypted sensitive data has a descrambler suitable for decrypting the sensitive data.

In the system with the security co-processor in accordance with the present invention messages are "signed" using preferably a secure hash. Similar in principle to the above-mentioned public-private-key cryptography, the secure hash is a one-way, collision free cryptography algorithm akin to a compression algorithm. Collision free means that for any single input there is a unique corresponding hash output. That is, if two segments of data are identical except for one bit, two entirely different hash outputs would result. One-way means that there is no feasible way to derive any of the input data from the hash value. Secure hash makes it very difficult to electronically forge signatures because is requires experimentation with an endless number of inputs only one of which may produce the particular hash output.

For example, smart cards may have the private-key and sensitive data such as, an account number (e.g., debit account), and the digital certificate which is equivalent to the digital identity and within which the public-key is embedded. The smart card owner knows the PIN that unlocks the account.

Thus, in operation, the system in accordance with the present invention (as described in conjunction with FIG. 4 above) reads from the smart card the account number, the digital certificate and, optionally, the private-key into the security co-processor (122), and then it prompts the smart card owner to enter the PIN via the trusted input device (130). The interface (134) operates to protects the sensitive data from being obtained by the computer (114) without first being encrypted. Hence, all of the secure processing of the electronic transaction application is then performed in the secure computing environment (104) in order to preserve the integrity of the sensitive data. The sensitive data is encrypted using preferably a symmetric or asymmetric encryption algorithm and then it is combined with other parts of the message such as the transaction amount. The message is then electronically signed.

Figure 7:
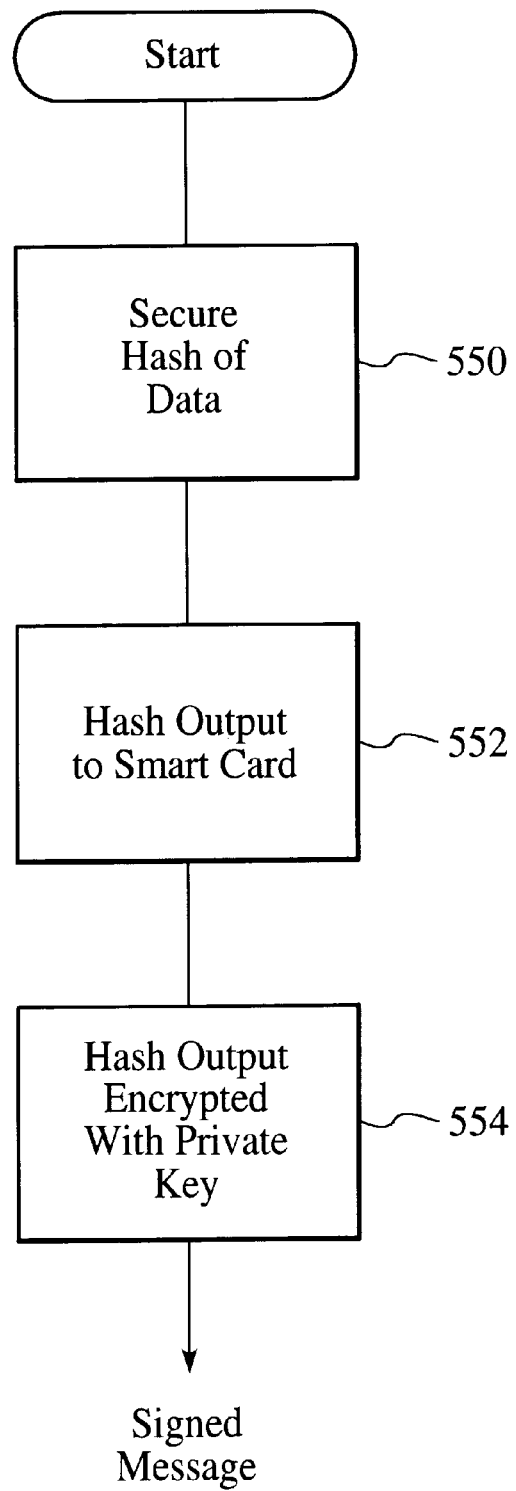
FIG. 7 is a flow diagram of the digital signing process for authenticating electronic transactions in the system with the security co-processor.

FIG. 7 is a flow diagram of the digital signing process for authenticating electronic transactions in the system with the security co-processor. First, a secure hash of the sensitive data is performed, via step 550. For reasons rooted in common security industry practice, private-keys should never come off the smart cards. This is why the hash output is handed to the smart card, via step 552, to be encrypted with the private-key in the smart card, via step 554.

The private-key is a long string of bits (typically 1024 bits) which is typically embedded in the smart card in a trusted secure environment of the issuer (e.g., American Express). Therefore, if the issuer provides a smart card with such a private-key and it takes the PIN to unlock the private-key, then it would not be possible for someone to impersonate the smart card holder. As a result, electronic transactions performed by the smart card holder will be provable and the smart card holder cannot repudiate them (i.e., participation of the smart card holder in the electronic transaction is verifiable and the smart card holder cannot refuse to comply after the electronic transaction is completed).

Messages signed with the private-key are then handed over to the computer (114) (FIG. 4) for transmission through the network (110). At the other end, a bank or other transaction partner(s) have their own security mechanism for decrypting the message.

In one embodiment of the present invention biometric data such as retinal scan, thumbprint, etc. is embedded in the smart card. The smart card holder provides a biometric data sample and enters the PIN. The combination of the biometric data and the PIN precludes repudiation of the electronic transaction because it is a substantially undisputed proof that the smart card holder was authorized to conduct the electronic transactions and did conduct the particular electronic transactions. In this architecture the biometric data therefore is never resident in the nonsecure computing environment.

Pre-verification of digital certificates of transacting parties saves verification processing time especially in a high volume, high frequency electronic transactions environment. Pre-verified digital certificates of transacting parties can be stored for future accelerated use (without having to repeat the verification process). Instead of a certificate cache in a conventional system which can be compromised by adding a false certificate, a trusted certificate cache is provided in the system in accordance with the present invention. The trusted certificate cache is typically resident in a RAM. The trusted certificate cache in the secure computing environment holds the pre-verified digital certificates which, by reason of the interface, cannot be compromised. Once a digital certificate has been verified, an API command can be used to store the certificate in the trusted certificate cache.

Caching of verified certificates speeds validation of certificate chains. To verify the issuer's signature on a certificate requires a computationally very expensive cryptographic signature verification. Certificate caching means that the expensive signature verification only has to occur once, at the time that the certificate is verified before being accepted into the cache. Once accepted, the certificate can be used without checking the issuer's signature each time.

Figure 8:
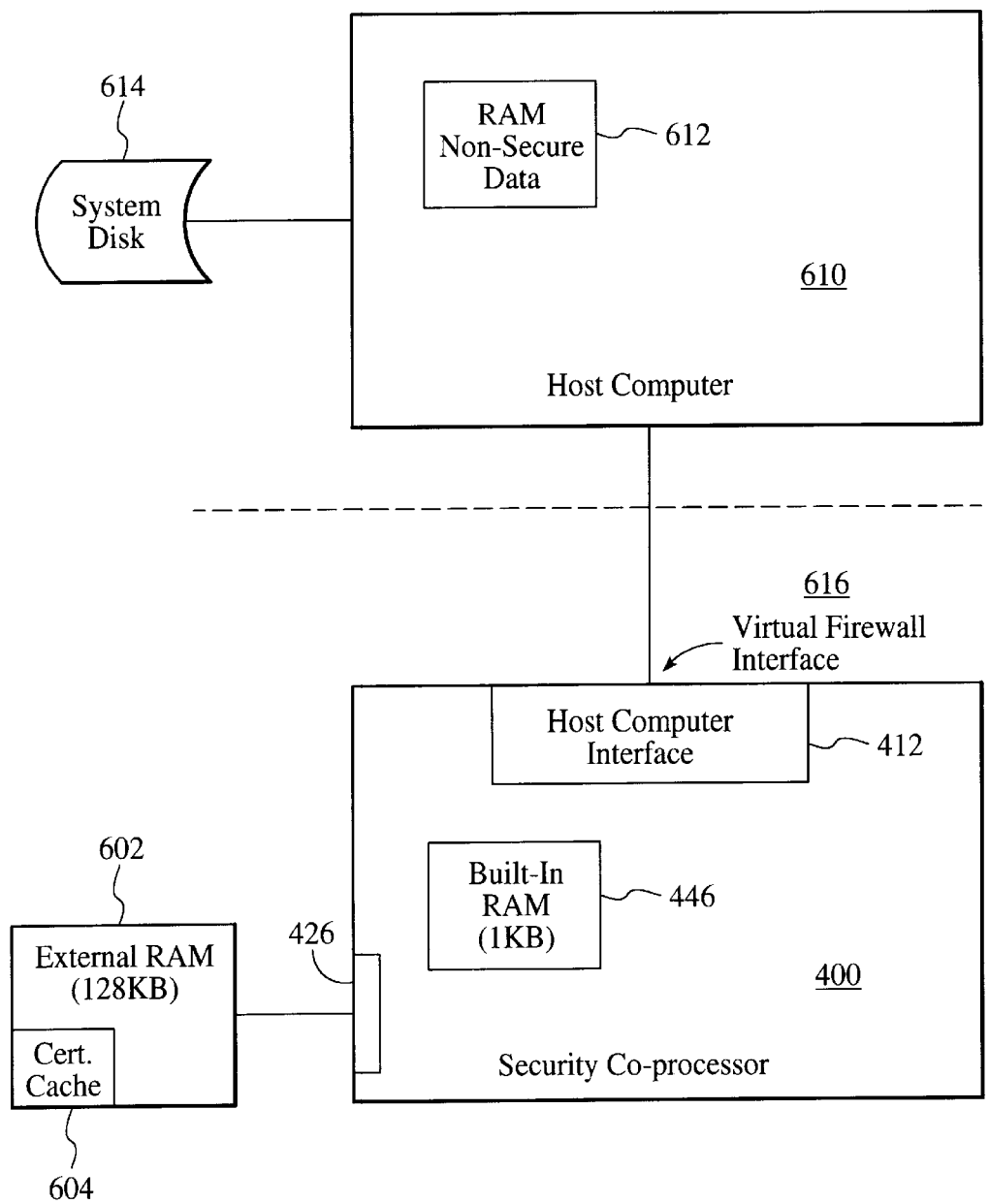
FIG. 8 is a block diagram of a two tier memory system in accordance with the present invention.

One embodiment of the present invention includes a two tier memory which provides greater processing capacity to the security co-processor. FIG. 8 is a block diagram of a two tier memory system in accordance with the present invention. The security co-processor 400 (as in FIG. 6) includes a built-in RAM 446. In the secure computing environment, the security co-processor 400 is also coupled to an external RAM 602 via the external RAM interface 426. Access by the computer 610 to the built-in RAM 446 and the external RAM 602 is prevented by the interface 616 within the host computer interface 412. The built-in RAM 446 (a 1024 bit memory) is embedded in the security co-processor 400 chip. Sensitive data is kept in the built-in RAM 446. The external RAM 602 is a high volume commodity device external to the security co-processor 400 (a 128 KBytes memory). Encrypted sensitive data, digital certificates and temporary variables are stored in the external RAM 602. It would take an expensive ($50,000) logic analyzer to capture data passing to and from the external RAM 602. Therefore, the data is not easily captured, and is still protected from software attacks.

When the built-in RAM 446 is temporarily full the security co-processor can perform cryptopaging which means that the sensitive data can be encrypted and temporarily placed in the external RAM 602, or the host RAM 612 or system disk 614. The external RAM 602 can be also used for the trusted certificate cache 604 for holding the pre-approved digital certificates. To further discuss this feature refer now to FIGS. 8 and 9 together.

A digital certificate has a validity period during which it is valid. Some certificates also have additional validity period limitations to limit the usage of the certificate's corresponding private key to perform signatures to a period which ends sooner, so that the certificate can be used to verify things which its private key has signed even after its private key can not be used to perform signatures. These limitations are added in certificate extensions.

Figure 9:
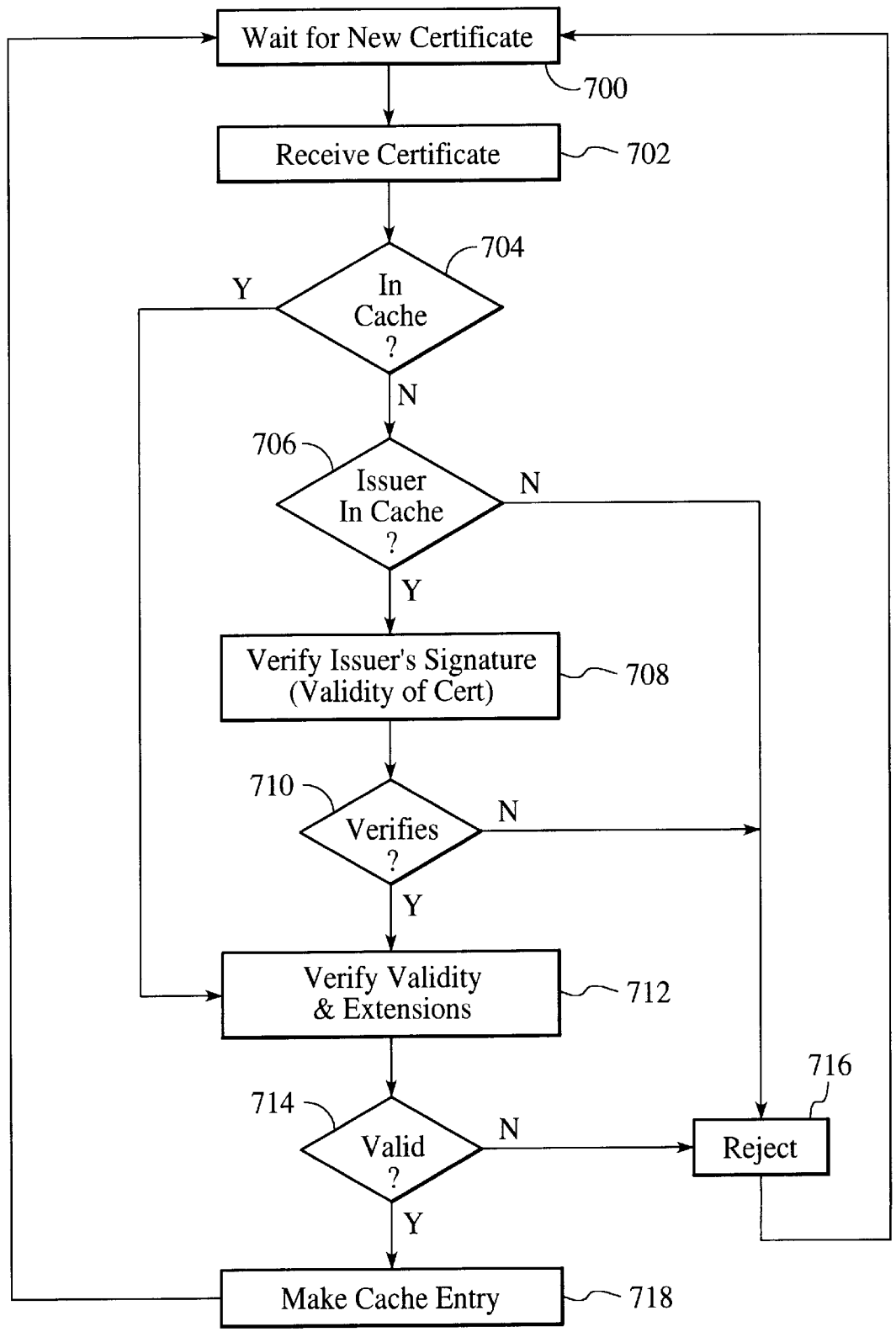
FIG. 9 is a flow diagram of building a trusted certificate cache in system with the security co-processor.

FIG. 9 is a flow diagram of building a trusted certificate cache 604 in the security co-processor. Building the trusted certificate cache begins by waiting for a new digital certificate, via step 700. With each new certificate the process repeats. Once a certificate is received (and decoded if required) via step 702, its cryptographic hash or other unique data is compared against the certificates already residing in the cache via step 704. If the new certificate is already present in the cache, its validity dates and optional limiting extensions are verified via step 712. If the certificate is still valid via step 714 then it is accepted into the certificate cache via step 718. Alternatively if the certificate validity checked in step 712 are not valid via step 714, the new certificate is rejected via step 716.

Alternatively, if the new certificate is not already present in the cache as determined by step 704, then the cache is checked for the presence of the certificate's signing issuer certificate via step 706. If the issuer's certificate is not present in the cache, then the certificate is rejected via step 716.

If the certificate's issuer is present in the cache via step 706, then the issuer's signature on the certificate is checked in step 708. If the signature is not valid via step 710, the certificate is rejected via step 716. If the issuer's certificate is valid via step 710, then the certificate's validity and optional extensions are checked via step 714. If the certificate is still valid via step 714 then it is accepted into the certificate cache via step 718. Alternatively if the certificate validity checked in step 712 are not valid via step 714, the new certificate is rejected via step 716. Accordingly, the gradual building of the cache 604 increasingly saves processing time spent on digital certification verification.

Finally, the system with the security co-processor in accordance with the present invention provides for the use of cheaper smart cards. Smart cards used with the system in accordance with the present invention, require less built-in functionality than conventional smart cards used in conventional systems because most of the built-in functionality is included in the security co-processor. A security co-processor and a number of smart cards with reduced built-in functionality cost less than the total cost of the same number of smart cards with extensive built-in functionality. Therefore, the system in accordance with the present invention can be implemented at a much lower cost than conventional systems. This reduction in cost is significant in the high-volume electronic transactions environment of large banks and credit organizations, and corporate users.

A method and system have been disclosed for secure encrypted and authenticated transactions. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A system for secure transactions in a host computer, comprising:

a security co-processor; and an interface for interfacing the security co-processor to the host computer, the interface including an interface communication protocol for restricting access by the host computer to data passing through the security co-processor, wherein secure transaction processing is performed locally in the security co-processor and non-secure transaction processing is performed in the host computer system.

2. The system of claim 1, wherein the sensitive data includes personal data and personal identification data.

3. The system of claim 2, wherein the interface communication protocol is implemented in an application programming interface.

4. The system of claim 1, wherein the system further includes means for providing trusted input coupled to the security co-processor.

5. The system of claim 4, wherein the trusted input means comprises one of a keyboard and a keypad.

6. The system of claim 5, wherein the trusted input means includes a secure mode indicator for indicating a secure mode in response to requests from the host computer for keyboard entries of the sensitive data including the personal identification data.

7. The system of claim 6, wherein the secure mode indicator includes a LED.

8. The system of claim 4, wherein the system further includes a smart card interface coupled to the security co-processor, the smart card interface for interfacing with smart cards which include the personal data and a private key.

9. The system of claim 8, wherein the system further includes a trusted display coupled to the security co-processor for providing a visual feedback and true transaction information.

10. The system of claim 9, in which the security co-processor includes:

a microprocessor;

a microprocessor support coupled to the microprocessor;

a display interface coupled to the microprocessor, the display interface for providing the visual feedback and the true transaction information to the trusted display;

first means interfacing between the microprocessor and the trusted input means;

second means interfacing between the microprocessor and the smart card interface;

a memory coupled to the microprocessor;

an external memory interface coupled to the microprocessor; the external memory interface for interfacing with an external memory;

a cryptographic controller unit coupled to the microprocessor, the cryptographic controller unit for providing data in encrypted form; and third means for interfacing between the microprocessor and a plurality of computer systems.

11. The system of claim 10, in which a two tier memory comprises the memory and the external memory, wherein the memory is for storing a transaction application and data including the sensitive data and the external memory is for storing temporary variables and a certificate cache.

12. The system of claim 10, in which the cryptographic unit performs an asymmetric or symmetric encryption of the sensitive data in order to provide the sensitive data in encrypted form.

13. The system of claim 12, in which the sensitive data in the encrypted form is wrapped in unencrypted non-sensitive data to form a message, wherein the message is signed in the smart card with the private-key and is then handed to one of the plurality of computer systems for further transmission to a transaction party.

14. A system for secure transactions in a host computer, comprising:
   a security co-processor;
   an interface for interfacing the security co-processor to the host computer, the interface including an interface communication protocol for restricting access by the host computer to data passing through the security co-processor; and
   means for providing trusted input coupled to the security co-processor, wherein secure transaction processing is performed locally in the security co-processor and non-secure transaction processing is performed in the host computer system.

15. The system of claim 14, wherein the system further includes a smart card interface coupled to the security co-processor for interfacing with smart cards.

16. The system of claim 15, wherein the system further includes a trusted display coupled to the security co-processor for providing a visual feedback and true transaction information.

17. A system for secure transactions in a host computer, comprising:
   a security co-processor, the security co-processor including a processor, a processor support coupled to the processor; a display interface coupled to the processor, first interface means for receiving trusted input, the first interface means being coupled to the processor, smart card interface means coupled to the processor, a memory coupled to the processor, an external memory interface coupled to the processor, a cryptographic unit coupled to the processor, and second interface means coupled to the processor, the second interfacing means for interfacing with a plurality of computer systems;
   an interface for interfacing between the security co-processor and the host computer, the interface including an interface communication protocol for restricting access by the host computer to data passing through the security co-processor, wherein the interface is coupled to the second interface means;
   means for providing trusted input coupled to the security co-processor via the first interface means;
   a smart card interface coupled to the smart card interface means of the security co-processor, the smart card interface for interfacing between the security co-processor and smart cards; and
   a trusted display coupled to the display interface of the security co-processor for providing a visual feedback and true transaction information, wherein secure transaction processing is performed locally in the security co-processor and non-secure transaction processing is performed in the host computer system.

18. A method for secure transactions in a host computer, the method comprising the steps of:
   a) providing a security co-processor; and
   b) providing a interface for interfacing the security co-processor to the host computer, the interface including an interface communication protocol for restricting access by the host computer to data passing through the security co-processor, wherein secure transaction processing is performed locally in the security co-processor and non-secure transaction processing is performed in the host computer system.

19. The method of claim 18, wherein the interface communication protocol is implemented in an application programming interface.

20. The method of claim 18, wherein the method further includes the step of:
   c) providing means for providing trusted input coupled to the security co-processor.

21. The method of claim 20, wherein the method further includes the step of:
   d) providing a second interface coupled to the security co-processor for receiving sensitive data from a smart card.

22. The method of claim 21, wherein the method further includes the step of:
   e) providing a trusted display coupled to the security co-processor for providing a visual feedback and true transaction information.

23. The method of claim 22, wherein the security co-processor includes:
   a processor;
   a processor support coupled to the processor;
   a display interface coupled to the processor;
   first interfacing means for interfacing with one of a keyboard and a keypad, the first interfacing means being coupled to the processor;
   a smart card interface coupled to the processor;
   a memory coupled to the processor;
   an external memory interface coupled to the processor;
   a cryptographic unit coupled to the processor; and
   second interfacing means for interfacing with a plurality of computer systems, the second interfacing means being coupled to the processor.

24. The method of claim 23, wherein the method further includes the step of:
   f) executing a transaction application via the processor, wherein the transaction application is responsive to communications from the host computer that is conducted via a firewall, wherein the transaction application performs locally the secure transaction processing.

25. The method of claim 24, wherein the executing step f) further includes the step of:
   f1) indicating a secure mode in response to the communications from the host computer wherein keyboard entry of sensitive data is requested.

26. The method of claim 25, wherein the processor indicates a secure mode by turning on a LED.

27. The method of claim 25, wherein the executing step f) further includes the step of:
   f2) providing data to the trusted display in order to provide a visual feedback during the keyboard entry of sensitive data and for displaying the true transaction information.

28. The method of claim 27, wherein the executing step f) further includes the step of:
   f3) performing a encryption of the sensitive data in the cryptographic unit in order to provide the sensitive data in encrypted form.

29. The method of claim 28, wherein the encryption is a symmetric or asymmetric encryption operation of the sensitive data.

30. The system of claim 28, wherein the executing step f) further includes the steps of:

f4) transferring the message to a smart card via the smart card interface for signing;

f5) signing the message in the smart card with a private-key; and f6) handing the message to one of the plurality of computer systems for further transmission to a transaction party.

31. The method of claim 30, wherein the executing step f) further includes the step of:

f7) building a certificate cache with pre-verified and validated certificates indicating identities belonging to sources of messages, wherein the certificate cache is included in one of the memory and an external memory, and wherein the external memory is coupled to the processor via the external memory interface.

32. The method of claim 31, wherein the certificate cache building step f7) further includes the steps of:

f7a) determining if the certificate exists in the certificate cache as a pre-verified certificate;

f7b) determining if an issuer certificate within the certificate exists in the certificate cache if the certificate does not exists in the certificate cache;

f7c) verifying the validity of the issuer certificate if the issuer certificate exist in the certificate cache and the certificate does not exists in the certificate cache;

f7d) rejecting the message if the issuer certificate is invalid; and f7e) waiting for a new certificate.

33. The method of claim 31, wherein the certificate cache building step f7) further includes the steps of:

f7a) determining if the certificate exists in the certificate cache as a pre-verified certificate;

f7b) determining if an issuer certificate within the certificate exists in the certificate cache if the certificate does not exists in the certificate cache;

f7c) verifying the validity of the issuer certificate if the issuer certificate exists in the certificate cache and the certificate does not exists in the certificate cache;

f7d) verifying validity of certificate extensions if the certificate does not exist in the certificate cache and the issuer certificate is valid;

f7e) storing the certificate in the certificate cache if the certificate extensions are valid, the issuer certificate is valid, and the certificate does not exists in the certificate cache; and f7f) waiting for a new certificate.

34. The method of claim 31, wherein the certificate cache building step f7) further includes the steps of:

f7a) determining if the certificate exists in the certificate cache as a pre-verified certificate;

f7d) verifying validity of certificate extensions if the certificate exists in the certificate cache;

f7e) storing the certificate in the certificate cache if the certificate extensions are valid and the certificate exists in the certificate cache; and f7f) waiting for a new certificate.

35. The method of claim 31, wherein the executing step f) further includes the step of:

f8) processing a first biometric data provided to the security co-processor and a second biometric data resident on the smart card, wherein the first biometric data can be verified against the second biometric data.

36. A computer readable medium including program instructions for secure encrypted and authenticated transactions, the program instructions being executed via a security co-processor, the security co-processor communicating with a host computer via a host interface including a firewall, the firewall having functionality being enforced by an interface communication protocol for restricting access by the host computer to data passing through the security co-processor, the program instructions for:

a) indicating a secure mode in response to communications from the host computer wherein a keyboard entry of sensitive data is requested;

b) providing data to a trusted display in order to provide a visual feedback during the keyboard entry of the sensitive data and for displaying true transaction information;

c) performing an encryption of the sensitive data in a cryptographic unit within the security co-processor in order to provide the sensitive data in an encrypted form;

d) computing a hash of a message in order to form a mechanism for signature;

e) transferring the hash to a smart card for signing;

f) signing the message in the smart card with a private-key;

g) handing the message to the host computer for further transmission to a transaction party; and h) building a certificate cache with pre-verified and validated certificates indicating identities belonging to sources of messages received by the security co-processor, wherein secure transaction processing is performed locally in the security co-processor and non-secure transaction processing is performed in the host computer.

* * * * *